(12) United States Patent
Samuel et al.

(10) Patent No.: US 10,352,148 B2
(45) Date of Patent: Jul. 16, 2019

(54) ESTIMATING CASING WEAR USING MODELS INCORPORATING BENDING STIFFNESS

(71) Applicant: Landmark Graphics Corporation, Houston, TX (US)

(72) Inventors: Robello Samuel, Cypress, TX (US); . Aniket, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 137 days.

(21) Appl. No.: 15/300,754

(22) PCT Filed: Aug. 12, 2014

(86) PCT No.: PCT/US2014/050702
§ 371 (c)(1),
(2) Date: Sep. 29, 2016

(87) PCT Pub. No.: WO2015/152961
PCT Pub. Date: Oct. 8, 2015

(65) Prior Publication Data
US 2017/0022798 A1   Jan. 26, 2017

Related U.S. Application Data

(60) Provisional application No. 61/974,178, filed on Apr. 2, 2014.

(51) Int. Cl.
*G01B 21/00* (2006.01)
*E21B 47/00* (2012.01)
*G01B 21/08* (2006.01)

(52) U.S. Cl.
CPC .......... *E21B 47/0006* (2013.01); *G01B 21/08* (2013.01)

(58) Field of Classification Search
CPC ...................................................... G01B 21/08
See application file for complete search history.

(56) References Cited

U.S. PATENT DOCUMENTS

| 3,343,890 A | 9/1967 | Homer |
| 3,682,256 A * | 8/1972 | Stuart ...................... E21B 47/00 |
| | | 166/254.1 |

(Continued)

FOREIGN PATENT DOCUMENTS

| CN | 202166578 | 3/2011 |
| WO | 1997/13951 | 4/1997 |

(Continued)

OTHER PUBLICATIONS

"Australian Application Serial No. 2014389447; First Examination Report dated Jul. 12, 2017", 8 pages.

(Continued)

*Primary Examiner* — Jamel E Williams
(74) *Attorney, Agent, or Firm* — Gilliam IP PLLC

(57) ABSTRACT

An illustrative method for estimating casing wear, including estimating, as a function of position along a casing string, a side force of a tubular string against the casing string, wherein said estimating accounts for a bending stiffness of the tubular string. The method further including determining, based at least in part on the side force, a casing string wear volume as a function of position along the casing string, and presenting the casing string wear volume to a user.

20 Claims, 6 Drawing Sheets

(56) References Cited

U.S. PATENT DOCUMENTS

| | | | |
|---|---|---|---|
| 4,744,030 A * | 5/1988 | Carlson | G01V 3/28 181/105 |
| 5,044,198 A | 9/1991 | Ho | |
| 5,857,531 A | 1/1999 | Estep et al. | |
| 9,605,526 B2 * | 3/2017 | Samuel | E21B 12/02 |
| 2002/0144545 A1 | 10/2002 | Cesmat et al. | |
| 2004/0206509 A1 | 10/2004 | Slack | |
| 2015/0176401 A1 * | 6/2015 | Samuel | E21B 44/00 702/6 |
| 2016/0119591 A1 * | 4/2016 | Samuel | E21B 21/066 175/24 |
| 2016/0230528 A1 * | 8/2016 | Samuel | E21B 12/02 |
| 2016/0290123 A1 * | 10/2016 | Samuel | E21B 3/00 |
| 2016/0326844 A1 * | 11/2016 | Samuel | E21B 12/02 |

FOREIGN PATENT DOCUMENTS

| | | |
|---|---|---|
| WO | 2002/083264 | 10/2002 |
| WO | 2012/037248 | 3/2012 |

OTHER PUBLICATIONS

"Australian Application Serial No. 2014389447; Second Examination Report dated Oct. 30, 2017", 4 pages.

"Canada Application Serial No. 2,943,052; Office Action Report dated Sep. 19, 2017", 6 pages.

Nagy, "Casing Wear evaluation through simulation", SPE International Conference, Visegrád, presented Nov. 21, 2013, [retrieved from internet on Jun. 14, 2017] <URL: http://connect.spe.orgHigherLogicSystemDownloadDocumentFile.ashx?DocumentFileKey=02de3cd3-8384-4ba6-9b83-fd9be93a3743>, Nov. 21, 2013, 25 pages.

Tikhonov, et al., "Dynamic Model for Stiff String Torque and Drag", SPE/IADC Drilling Conference and Exhibition, Amsterdam, presented Mar. 5-7, 2013, [retrieved from internet on Jun. 14, 2017] <URL: https://www.onepetro.org/conference-paper/SPE-163566-MS>.

PCT International Search Report and Written Opinion, dated Jan. 8, 2015, Appl No. PCT/US2014/050702, "Estimating Casing Wear Using Models Incorporating Bending Stiffness," filed Aug. 12, 2014, 14 pgs.

PCT International Preliminary Report on Patentability, dated Jul. 1, 2016, Appl No. PCT/US2014/050702, "Estimating Casing Wear Using Models Incorporating Bending Stiffness," filed Aug. 12, 2014, 9 pgs.

McSpadden, A., et al., "Development of a Stiff-String Forces Model for Coiled Tubing," SPE-74831-MS, prepared for presentation at the SPE/ICoTA Coiled Tubing Conference and Exhibition held in Houston, Texas, USA, Apr. 9-10, 2002.

Gorokhova, Lidia, et al., "Comparing Soft-String and Stiff-String Methods Used to Compute Casing Centralization," SPE 163424, SPE Drilling & Completion, Mar. 2014, p. 106-114.

Deli, Gao et al., "Prediction of Casing Wear in Extended Reach Drilling," Pet. Sci., (2010)7: p. 494-501.

Hall JR., R.W. et al., "Recent Advances in Casing Wear Technology," 1994. Paper IADC/SPE 27532, presented at the IADC/SPE Drilling Conference, Dallas, Texas, USA, Feb. 16-18, 1994, 8 pgs.

Hall JR., R.W. et al., "Contact Pressure Threshold: An Important New Aspect of Casing Wear," SPE 94300, presented at the SPE Production and Operations Symposium, Oklahoma City, Oklahoma, USA, Apr. 17-19, 2005, 7 pgs.

* cited by examiner

ESTIMATING CASING WEAR USING MODELS INCORPORATING BENDING STIFFNESS

CROSS-REFERENCE TO RELATED APPLICATION

This application claims priority to Provisional U.S. Application Ser. No. 61/974,178, titled "Estimating Casing Wear Using Models Incorporating Bending Stiffness" and filed Apr. 2, 2014 by Robello Samuel and Aniket, which is incorporated herein by reference.

BACKGROUND

To produce hydrocarbons from subterranean reservoirs, oilfield operators drill and at least partially case boreholes. For example, a shallow portion of the borehole may be promptly cased to protect the water table from possible contamination by hydrocarbons and drilling fluids, whereas deeper portions of the borehole may be later cased as needed to facilitate the drilling process or completion of the well.

Each borehole is typically cased with a casing string, i.e., lengths of steel pipe threaded together and lowered into the borehole before being cemented in place. Despite being made of steel and secured by cement, casing strings can fail. Among the many factors that may contribute to casing failure is internal casing wear. The main cause of such casing wear is the frictional rubbing of other tubular strings on the inner surface of the casing string. For example, as a drill string moves and rotates inside a casing string, it rubs against the inner surface of the casing string, potentially reducing the wall thickness and thereby degrading the casing string's integrity and resistance to deformation.

Operators attempt to anticipate such casing wear and account for it when setting out suitable casing string specifications for each borehole. However, if their predictions are inaccurate, they incur excess costs in two forms: overly thick casing walls due to unreasonably high safety margins, and downtime to address failures of casing integrity.

BRIEF DESCRIPTION OF THE DRAWINGS

Accordingly, there are disclosed herein systems and methods that estimate casing string wear volume based on a tubular string side force estimation that accounts for bending stiffness. In the drawings.

Figure 1:
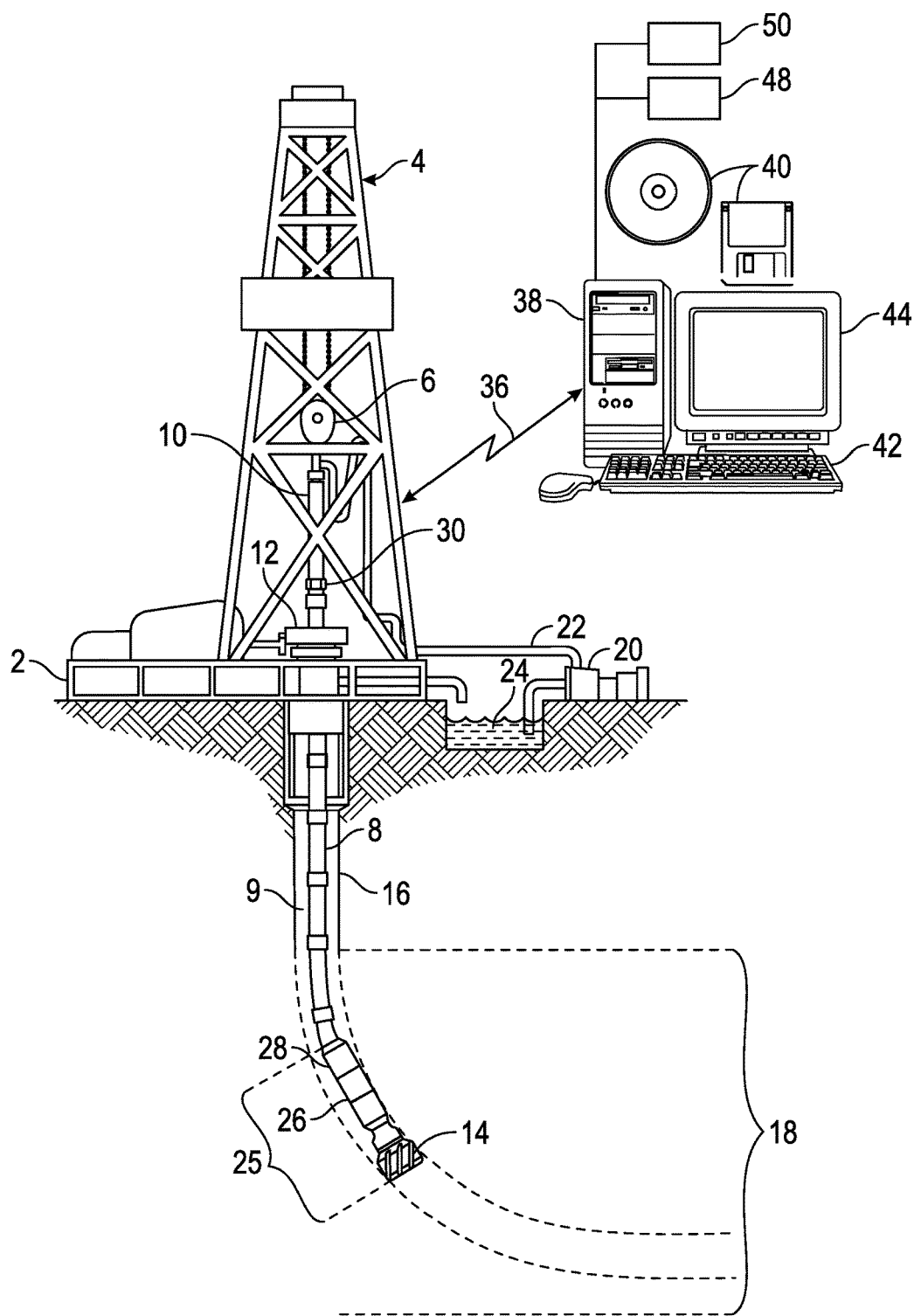
FIG. 1 shows an illustrative well drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems and methods for estimating casing string wear volume based on a tubular string side force estimation that accounts for bending stiffness. Certain illustrative embodiments include estimating, as a function of position along a casing string, a side force of a tubular string against the casing string, and determining, based at least in part on the side force, a log of casing string wear volume as a function of position along the casing string. The method may be implemented as software stored in a nontransient information storage medium and executed by a processor.

FIG. 1 shows an illustrative drilling environment, in which a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. As the drill bit 14 rotates, it creates a borehole 16 that passes through various formations 18. A pump 20 circulates drilling fluid through a feed pipe 22 to the kelly 10, downhole through the interior of drill string 8, through orifices in the drill bit 14, back to the surface via the annulus 9 around the drill string 8, and into a retention pit 24. The drilling fluid transports cuttings from the borehole 16 into the retention pit 24 and aids in maintaining the integrity of the borehole 16. An upper portion of the borehole 16 is cased and the lower portion is open (uncased) borehole.

The drill bit 14 is just one piece of an open-hole LWD assembly that includes a bottomhole assembly 25 having one or more drill collars 26 and logging tool 28. Drill collars 26 are thick-walled steel pipe sections that provide weight and rigidity for the drilling process. The logging tool 28, which may be integrated into one of the drill collars, gathers measurements of various drilling or formation parameters. Illustrative drilling parameters include weight on bit, torque, and rate of penetration.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used. In accordance with at least some embodiments, measurements collected from the logging tool 28 are processed by a computer 38 to produce one or more well logs for analysis by a user. The contemplated logs include a casing string wear log.

The telemetry signals are supplied via a communications link 36 to the computer 38 or some other form of a data processing device. Computer 38 may include or be coupled to a non-transitory computer-readable medium (e.g., a hard-disk drive and/or memory) ("memory 48") and a processor 50 capable of executing instructions stored thereon. The memory 48 and processor 50 are coupled together by a bus which communicates information therebetween. Computer 38 operates in accordance with software (which may be stored on an external nontransient information storage medium 40 and/or the memory 48) and user input via an input device 42 to process and decode the received signals. The resulting telemetry data may be further analyzed and processed by a processor 50 of computer 38 to generate a display of useful information on a computer monitor 44 or some other form of a display device. For example, an operator could employ this system to obtain and monitor drilling parameters or formation properties.

Figure 2:
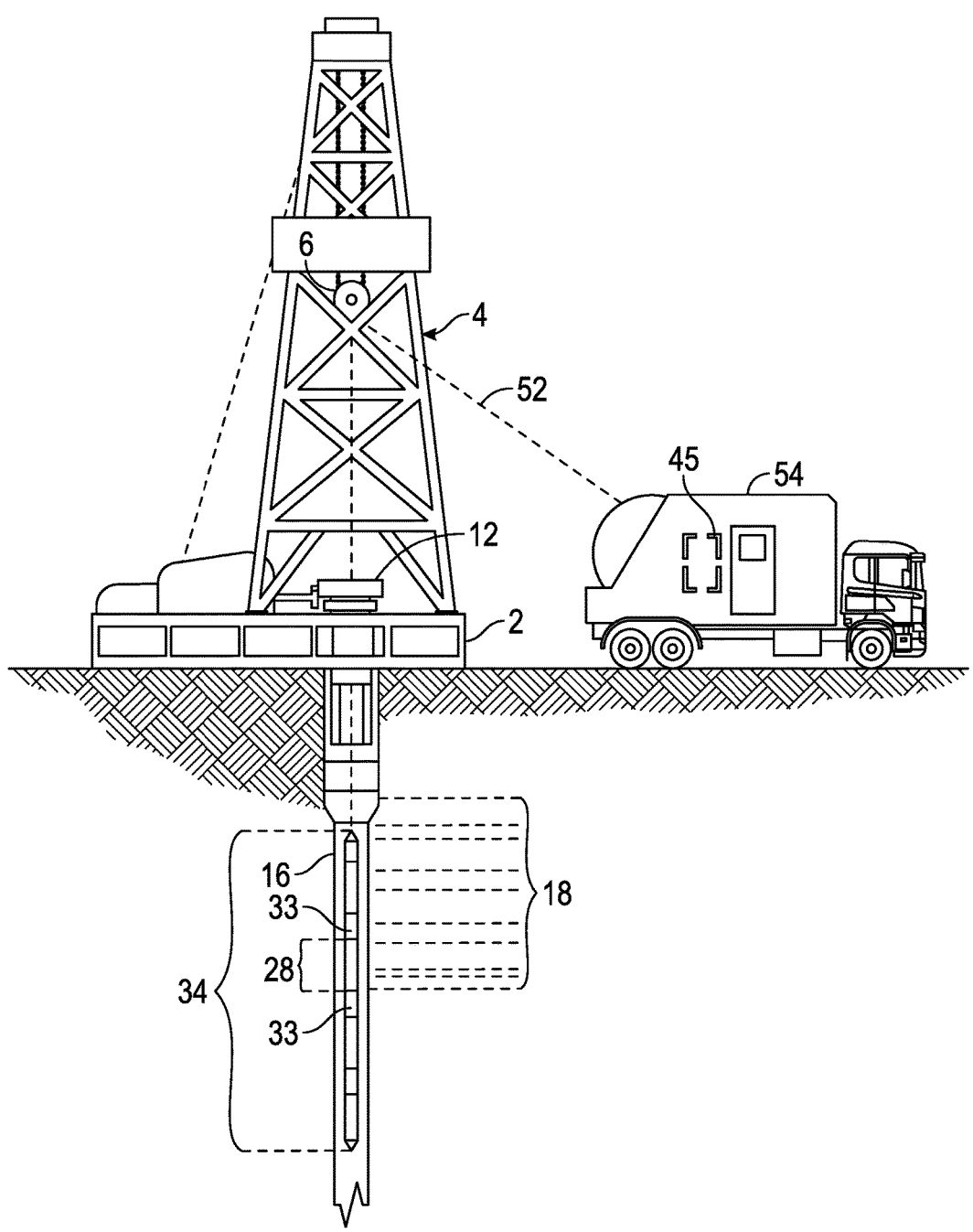
FIG. 2 shows an illustrative wireline tool environment.

At various times during the drilling process, the drill string 8 may be removed from the borehole 16, and wireline operations may be performed as shown in FIG. 2. Once the drill string has been removed, measurement and logging operations can be conducted using a wireline logging sonde 34 suspended by a cable 52 having conductors for transporting power to the logging sonde 34 and telemetry from the logging sonde 34 to the surface. In some embodiments, the logging sonde 34 may have pads and/or centralizing members to maintain the tool near the axis of the borehole as the tool is pulled uphole.

It should be noted that various types of sensors can be included with the wireline logging string 34. As shown, the illustrative wireline logging sonde 34 includes the previously described logging tool 28, which may collect formation data, such as acoustic logging data, and/or casing wall measurements (i.e., measurements of wear of the inner casing wall). The logging tool 28 may be coupled to other modules of the wireline logging string 34 by one or more adaptors 33.

A logging facility 54 collects measurements from the logging sonde 34, and includes a computer system 45 (similar to the computer system 38 of FIG. 1) for processing and storing the measurements gathered by the sensors. Among other things, the computer system 45 may include a non-transitory computer-readable medium (e.g., a hard-disk drive and/or memory) capable of executing instructions to perform such tasks. In addition to collecting and processing measurements, the computer system 45 may be capable of controlling the logging string 34 and logging tool 28. The logging facility 54 may further include a user interface (not shown) which displays the measurements, for example, a monitor or printer.

In at least some embodiments, a portion of the wellbore 16 is cased. The memory 40, 48 of the computer 38, 45 includes a casing wear estimation program which, when executed by the processor 50, estimates a side force of a tubular string (e.g., the drillstring 8) against the inner wall of the casing, accounting for a bending stiffness of the tubular string. The program further determines, based at least in part on the side force, a casing string wear volume as a function of position along the casing string, and may present the determined wear volume to a user via a display, such as computer monitor 44.

In at least some embodiments, the program employs a stiff string and/or finite element model in estimating the side force. The side force may be combined with measurements or estimates of other parameters such as a wear factor, rotational speed of the tubular string, and drilling time, to estimate the casing wear volume. Moreover, the program may acquire measurements of the wear volume of the casing string and based thereon may update prior estimates of the model parameters such as the wear factor.

Figure 3:
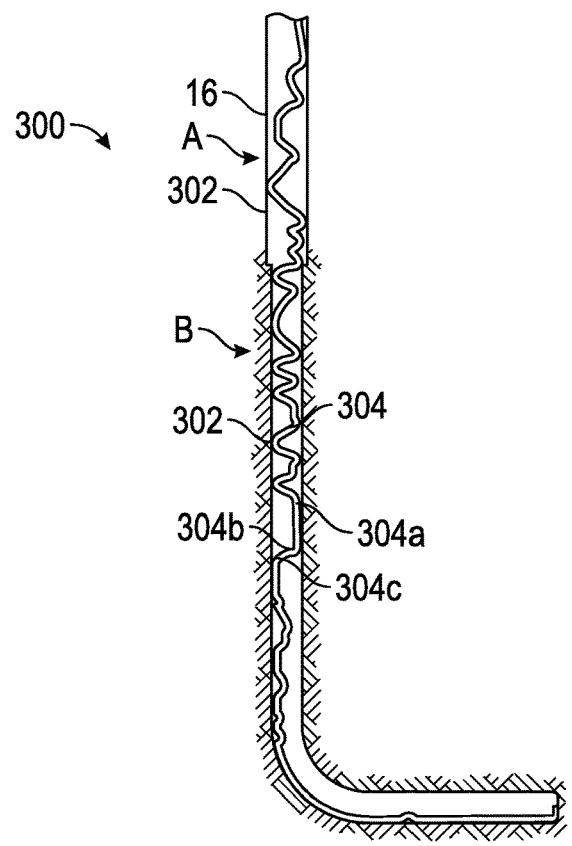
FIG. 3 is a cross-sectional view of an illustrative cased well.

FIG. 3 shows a cross-sectional view of a portion of an illustrative cased well 300. The well 300 includes the wellbore 16 having a casing 302 running through a first cased portion A and a second cased portion B. In some wells, the casing 302 may have a larger diameter in cased portion A than in cased portion B. The variance in casing string diameter, thickness and type may affect the rate of wear of the casing string.

Within the casing string is a tubular string 304 whose location may be determined via simulation. The simulation may determine the location of the tubular string 304 by, e.g., modeling the casing string geometry and simulating the insertion of the tubular string into the casing. The simulation may employ, for example, a finite element analysis or a set of equations for a "stiff string" model. Both such approaches account for the bending stiffness of the tubular string when determining the location of the tubular string. Three distinct contact points 304a-c of tubular string 304 are identified in FIG. 3 and illustrated in greater detail in FIGS. 4A-4C. For these contact points 304a-c, and indeed for each position along the casing string, the software determines the side force exerted by the tubular string on the inner surface of the casing string.

Figure 4A:
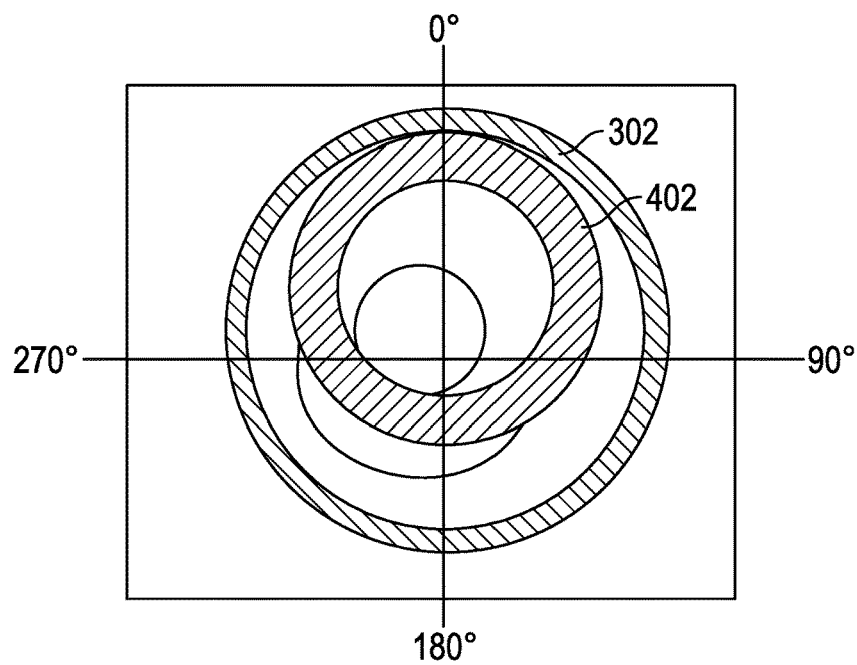
FIGS. 4A-C show various top-down views of an illustrative tubular string in contact with the inner wall of a casing string.
Figure 4B:
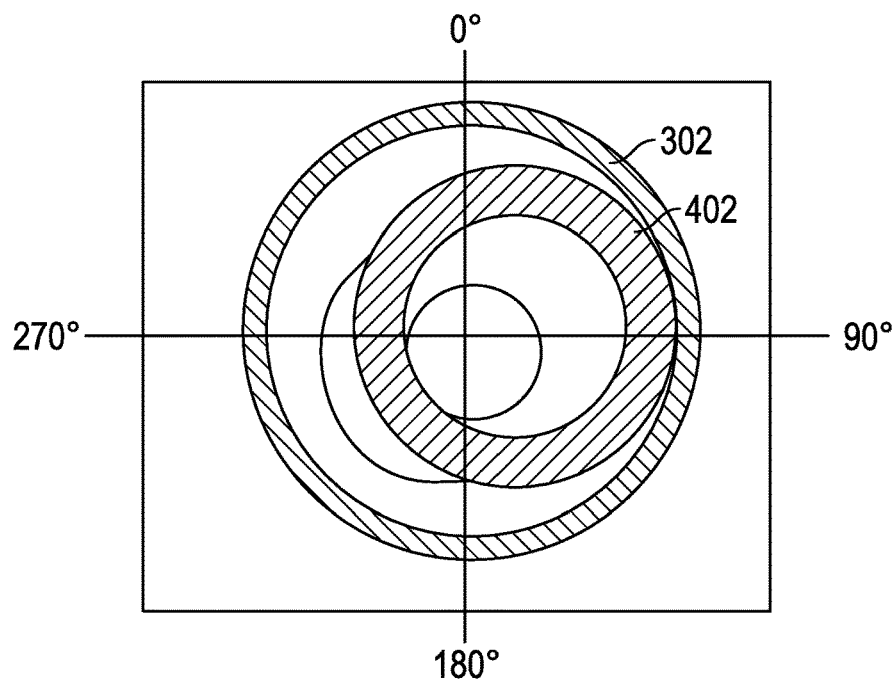
Figure 4C:
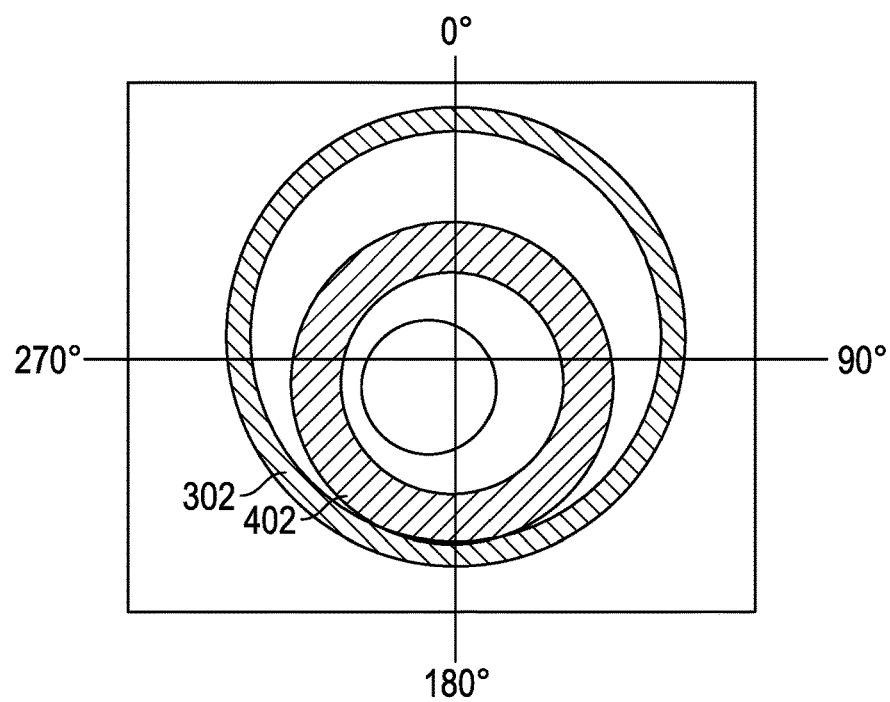

FIGS. 4A-C illustrate a top-down view of the tubular string 402 arranged within the casing 302. The tubular string 402 may be, for example and without limitation, a drill string, coiled tubing, or additional casing. FIGS. 4A-C include grid lines depicting 0°, 90°, 180°, and 270° to illustrate the tubular string's 402 position within the casing 302. For example, FIG. 4A corresponds to position 304a of FIG. 3 and illustrates the tubular string 402 in contact with the casing 302 at approximately the 0° position. FIG. 4B corresponds to position 304b of FIG. 3 and illustrates the tubular string 402 in contact with the casing 302 at approximately the 90° position. FIG. 4C corresponds to position 304c of FIG. 3 and illustrates the tubular string 402 in contact with the casing 302 at approximately the 180° position. It will be appreciated that FIGS. 4A-C are for illustrative purposes only and one of ordinary skill in the art will appreciate that the model may predict the tubular string in contact with the casing string at any angle from 0° to 359° (or similar alternatives, such as 0° to +/−180°).

As contrasted with "soft-string" models that account for the weight of the tubular string but fail to account for bending stiffness—leading to the assumption that the tubular string is in contact and wears against only one side (e.g., 0°) of the casing—the "stiff-string" and finite element models employed herein which account for the tubular string stiffness, thereby enabling determination of casing wear at certain circumferential contact points (e.g., 0° to 360°) and individual positions. This non-uniform distribution of side force offers much improved estimation of casing wear distribution. Though the finite element models are generally more complex, and therefore may require increased computing power and/or computation time, they may better predict casing wear than the stiff-string model, which may nevertheless be sufficiently accurate. Further details on stiff-string models may be found in references such as A. McSpadden and K. Newman, "Development of a Stiff-String Forces Model for Coiled Tubing," SPE-74831-MS (2002), and L. Gorokhova, A. Parry, and N. Flamant, "Comparing Soft-String and Stiff-String Methods used to Compute Casing Centralization," SPE-163424-PA (2014).

In addition to providing a more accurate determination of contact points, the stiff-string and finite-element models provide an estimate of the axial compression and tension forces along the tubular string, together with the lateral (side) forces of the tubing string on the inner surface of the casing. Such force determinations may also account for gravity (i.e., the weight of the tubular string) and the frictional forces exerted between the tubular string and the casing string. Moreover, as the tubular string moves and rotates, the borehole fluid exerts viscous drag forces that may also be taken into account. The interaction of these various factors is also accounted for in predicting the tubular string location and side forces on the inner surface of the casing string. The location and side forces are expected to vary as a function of time (as the drilling process progresses and the drill string moves along the evolving borehole trajectory). Any such time variation may be tracked and accounted for in the subsequent determination of casing string wear volume.

Figure 5:
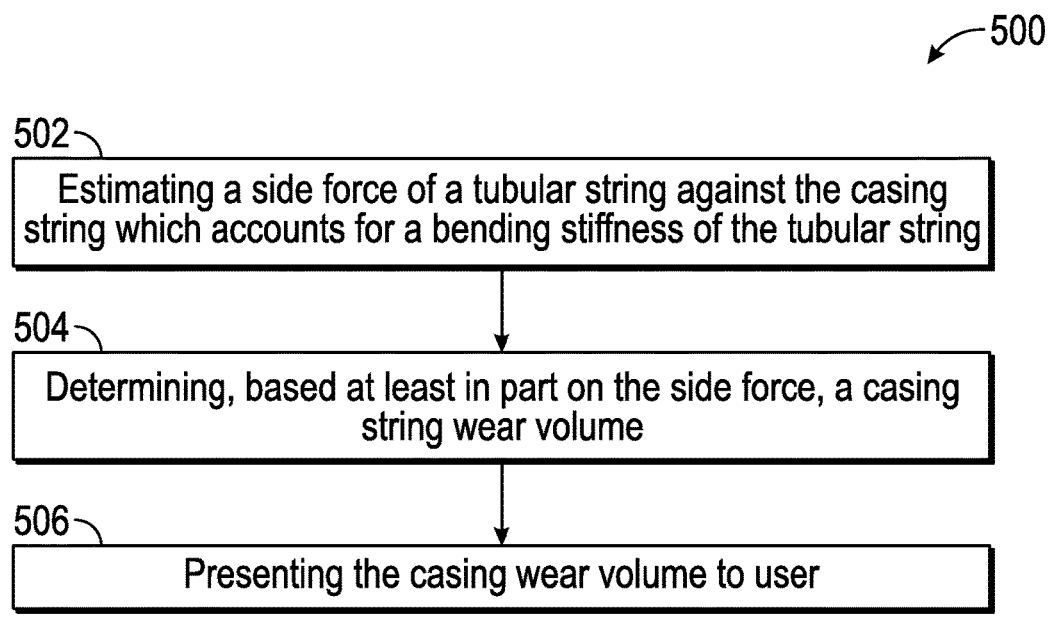
FIG. 5 is a flow diagram of an illustrative casing wear estimation method.

FIG. 5 is a flow diagram of an illustrative casing wear estimation method 500. The method 500 may be implemented by a computer system having a program stored on a nontransient computer readable medium and executed by a processor to estimate the casing wear volume, such as the computer 38, memory 48, and processor 50 described above in FIG. 1. At block 502, the processor may execute the program, thereby estimating a side force of a tubular string against the casing string. Such estimations account for a bending stiffness of the tubular string and are performed as a function of position along the casing string. In some embodiments, such estimations of the side force may be calculated by employing models which account for the bending stiffness of the tubular, such as a stiff string model or finite element model as known to those skilled in the art and referenced above.

At block 504, the program may calculate or determine, based at least in part on the estimated side force, a casing string wear volume as a function of position along the casing string. Such may be accomplished by the program estimating a contact force (applied force or side force) of the tubular string against the inner wall of the casing. Such contact force may be determined based on, for example, the weight-on-bit, clearance, incident angle of contact of the tubular string with the casing string, and compressive force, torque, and drag along the tubular string. Where the tubular string is not in contact with the casing string at certain locations, then the contact force is zero.

The program may alternatively or additionally incorporate the contribution of "viscous torque" and/or "viscous drag" (e.g., torque or drag due to viscosity of the drilling fluid). The side force calculations resulting therefrom are then inserted into an equation that accounts for a predicted wear rate (which includes friction and wear resistance of the casing string, or some combination of such phenomena as represented by a wear factor), rotations per minute, and time over which such side force is exerted to estimate the casing wear volume as a function of position along the tubular string. For example, the wear factor may be determined and refined based on measurements by a downhole tool, combined with the rotational speed and drilling time stored in memory by the processor. Thus, once a portion of the well has been drilled and actual wear volumes measured, the estimated wear resistance or wear factor estimates may be updated based on such measurements, thus also enabling an updated determination of casing wear volume for unmeasured and future portions of the casing string.

Thereafter, in further embodiments, a drilling parameter may be changed based on the measured wear volume. For example, weight on bit may be increased or decreased in order to adjust the side force, and thus the casing string wear volume. To update the wear factor estimates, the program may compare the measured wear volume to the estimated wear volume to determine an estimation error, which can be applied in an adaptive fashion to the wear factor estimation process.

Additionally, the models may include determining a circumferential contact position as a function of position along the casing. For example, the models may predict the tubular string contacts the casing string at a depth of 5,000 ft. with the circumferential contact position being 90° from a starting point around the circumference of the casing (similar to as discussed in FIGS. 4A-C). The determined casing string wear volume may then be presented to a user, as at block 506, for example via a display device (e.g., the computer monitor 44). The results may further be stored in computer memory.

Figure 6:
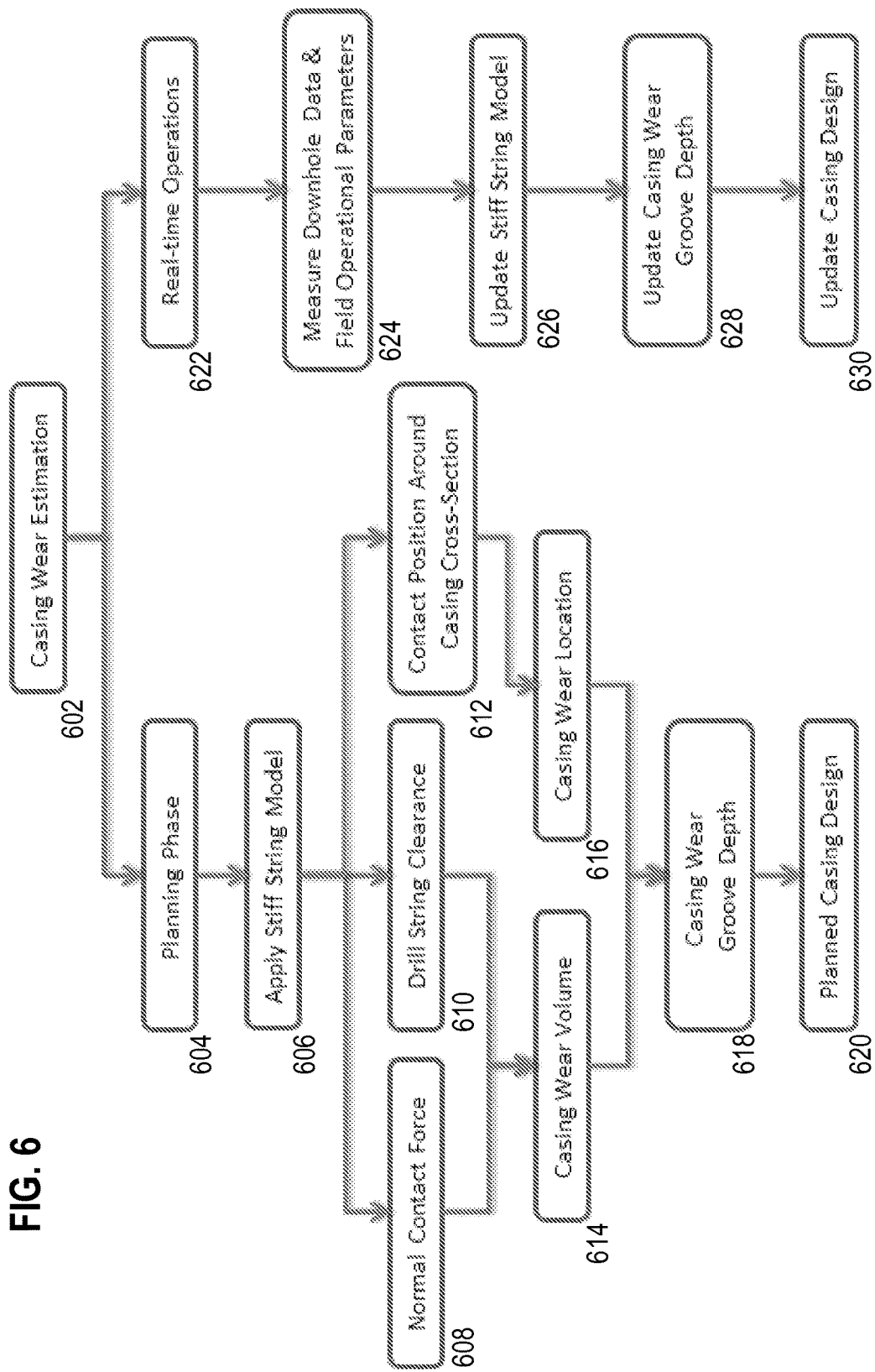
FIG. 6 is a framework relating certain illustrative stages of casing wear estimation.

FIG. 6 relates certain illustrative stages of a casing wear estimation framework 602. Framework 602 includes a planning phase 604 and a real-time operations phase 622. Planning phase 604 includes a simulation stage 606, which applies a stiff string model to estimate, as a function of position along the casing (and optionally as a function of time), a side ("normal contact") force 608, a drill string clearance 610, and a contact position 612. Based on the estimates 608-612, the system determines casing wear volume 614 and casing wear location 616. Based on the wear volume 614 and the wear location 616, the system derives, as a function of position and optionally as a function of time, a casing wear groove depth 618. In block 620, the system may recommend adjustments to the planned casing design to accommodate the estimated wear groove depths, e.g., opting for thinner casing walls where excess safety margins are discovered, or thicker casing walls where insufficient safety margins exist.

In operations phase 622, a data acquisition stage 624 obtains measurements of drilling parameters and where available, measurements of casing wear. In block 626 the system updates the simulation, adjusting model parameters as needed to match the actual operating parameters that affect tubing location, contact points, and side force, and determines the updated estimates 608-616. In block 628, the system responsively updates the casing wear groove depth. In block 630, the system may recommend adjustments to the drilling parameters (e.g., reduced weight on bit) or to the deployed casing design to accommodate the casing wear (e.g., by suggesting inner sleeves for casing sections having insufficient safety margin).

Numerous other modifications, equivalents, and alternatives, will become apparent to those skilled in the art once the above disclosure is fully appreciated. Where the term casing wear volume is used herein, other measures of casing wear may alternatively be employed, including casing wear groove depth, remaining casing wall thickness, a safety margin, or a predicted chance of casing integrity loss. It is intended that the following claims be interpreted to embrace all such modifications, equivalents, and alternatives where applicable.

Embodiments disclosed herein include:

A: A method for estimating casing wear including: estimating, as a function of position along a casing string, a side force of a tubular string against the casing string, wherein said estimating accounts for a bending stiffness of the tubular string; determining, based at least in part on the side force, an estimate of casing string wear as a function of position along the casing string; and presenting the estimate of casing string wear to a user.

B: A drilling system that includes: a drilling rig that drives a drillstring inside a borehole that is at least partially cased by a casing string, and a casing wear estimator coupled to the drilling rig to receive measurements of drilling parameters and responsively estimate, as a function of position along the casing string, a side force of the drillstring against the casing string while accounting for bending stiffness of the drillstring, wherein the casing wear estimator further determines, based at least in part on the side force, an estimate of the casing string wear as a function of position.

C: A nontransient information storage medium having a casing wear estimation program that causes a processor to implement a method including: estimating, as a function of position along a casing string, a side force of a tubular string against the casing string, wherein said estimating accounts for a bending stiffness of the tubular string; determining, based at least in part on the side force, an estimate of casing string wear as a function of position along the casing string, and presenting the estimate of casing string wear to a user.

Each of embodiments A, B, and C may have one or more of the following additional elements in any combination:

Element 1: where said estimating further accounts for a viscous drag. Element 2: determining a circumferential contact position as a function of position along the casing. Element 3: where said estimating employs a stiff string model. Element 4: where said estimating employs a finite element model. Element 5: where said determining is further based on at least one of a wear factor, a rotational speed of the tubular string, and a drilling time. Element 6: measuring the casing string wear, and updating prior estimates of a wear factor based on the measured casing string wear. Element 7: where the estimate of casing string wear is one of casing string wear volume, casing string wear groove depth, casing wall thickness, casing wall safety margin, and an estimated probability of casing string integrity loss. Element 8: where the casing wear estimator comprise a memory having casing wear estimation software, and a processor coupled to the memory to execute the casing wear estimation software, wherein the software causes the processor to generate and display a log of the casing string wear as a function of position.

What is claimed is:

1. A method for operating a drill string, comprising:
   estimating, as a function of position along a casing string, side forces of the drill string against the casing string, wherein said estimating accounts for a bending stiffness of the drill string;
   determining, based at least in part on the side forces, an estimate of casing string wear as a function of position along the casing string; and
   adjusting a drilling parameter during operation of the drill string based, at least in part, on the estimate of casing string wear.

2. The method of claim 1, wherein said estimating side forces further accounts for a viscous torque.

3. The method of claim 1, wherein said estimating side forces further accounts for a viscous drag.

4. The method of claim 1, wherein said estimating side forces comprises determining multiple different circumferential contact positions of the drill string with respect to the casing string as a function of position along the casing string.

5. The method of claim 1, wherein said estimating side forces employs a stiff string model.

6. The method of claim 1, wherein said estimating side forces employs a finite element model.

7. The method of claim 1, wherein said determining is further based on at least one of a wear factor, a rotational speed of the drill string, and a drilling time.

8. The method of claim 1, further comprising:
   measuring the casing string wear; and
   updating prior estimates of a wear factor based on the measured casing string wear.

9. The method of claim 1, wherein the estimate of casing string wear is a casing string wear volume or a casing string wear groove depth.

10. The method of claim 1, further comprising modifying a wall thickness of the casing string based, at least in part, on the estimate of casing string wear.

11. A drilling system that comprises:
    a drilling rig that drives a drill string inside a borehole that is at least partially cased by a casing string; and
    a casing wear estimator coupled to the drilling rig to receive measurements of drilling parameters and responsively estimate, as a function of position along the casing string, side forces of the drill string against the casing string while accounting for bending stiffness of the drill string,
    wherein the casing wear estimator further determines, based at least in part on the side forces, an estimate of casing string wear as a function of position.

12. The system of claim 11, wherein the casing wear estimator comprises:
    a memory having casing wear estimation software; and
    a processor coupled to the memory to execute casing wear estimation software, wherein the software causes the processor to generate and display a log of the casing string wear as a function of position.

13. The system of claim 12, wherein the casing wear estimation software employs at least one of a stiff string model and a finite element model.

14. The system of claim 11, wherein said estimating side forces accounts for at least one of a viscous torque and a viscous drag.

15. The system of claim 11, wherein said determining the estimate of casing string wear is further based on at least one of a wear factor, a rotational speed of the tubular string, and a drilling time.

16. The system of claim 11, further comprising:
    a logging tool that measures casing string wear,
    wherein the casing wear estimator compares the estimate of casing string wear to the measured casing string wear volume to update a casing wear factor.

17. A nontransient information storage medium having stored thereon program instructions for operating a drill string, the program instructions including instructions to:
    estimate, as a function of position along a casing string, side forces of a drill string against the casing string, wherein said estimating accounts for a bending stiffness of the drill string;
    determine, based at least in part on the side forces, an estimate of casing string wear as a function of position along the casing string; and
    adjust a drilling parameter based, at least in part, on the estimate of casing string wear.

18. The medium of claim 17, wherein determining the casing wear volume further includes determining at least one of a wear factor, a rotational speed of the drill string, and a drilling time.

19. The medium of claim 18, further comprising:
    measuring the wear volume of the casing string; and
    updating prior estimates of the wear factor based on the measured wear volume.

20. The medium of claim 17, wherein said estimating side forces comprises determining multiple different circumferential contact positions of the drill string with respect to the casing string as a function of position along the casing string.

* * * * *